United States Patent [19]
Yott et al.

[11] Patent Number: 4,782,742
[45] Date of Patent: Nov. 8, 1988

[54] AIR DISTRIBUTION SYSTEM FOR THE OCCUPANT COMPARTMENT OF AUTOMOTIVE VEHICLES

[75] Inventors: Edward W. Yott, Fraser, Mich.; Robert C. Mellin, Centerville, Ohio

[73] Assignee: General Motors Corporation, Detroit, Mich.

[21] Appl. No.: 91,019

[22] Filed: Aug. 31, 1987

[51] Int. Cl.⁴ ............................................. B60H 1/26
[52] U.S. Cl. ............................................. 98/2.03
[58] Field of Search .................. 98/2, 2.03, 2.04, 2.05; 415/54

[56] References Cited

U.S. PATENT DOCUMENTS

| | | | |
|---|---|---|---|
| 2,523,923 | 9/1950 | Rupert | 98/2.04 |
| 2,718,839 | 9/1955 | Wilfert | 98/2.03 X |
| 3,280,902 | 10/1966 | Laing | 415/54 |
| 3,602,126 | 8/1971 | Breitschwerdt | 98/2.04 |
| 4,343,230 | 8/1982 | Lundström | 98/2 |
| 4,512,240 | 4/1985 | Mahler et al. | 98/2.04 |

Primary Examiner—Harold Joyce
Attorney, Agent, or Firm—Charles R. White

[57] ABSTRACT

A variable speed transverse fan is provided for booster application in multi-ducted heating, ventilating and air conditioning systems for automotive vehicle. The transverse fan may be employed in a front arm rest and is selectively powered to provide air flow control to the rear passengers such as by increasing flow to the rear passenger when the main fan is on low speed. Because of the high turbining loss characteristic of this type of fan, a significant reduction of the air flow to the rear can be obtained if desired by turning the transverse booster fan off when the main fan is on high speed.

4 Claims, 1 Drawing Sheet

AIR DISTRIBUTION SYSTEM FOR THE OCCUPANT COMPARTMENT OF AUTOMOTIVE VEHICLES

This invention relates to heating, ventilating and air conditioning (HVAC) for occupant compartments of automotive vehicles and more particularly to a new and improved air distribution system providing optimized control of HVAC for passengers whether in front or rear seating areas of the occupant compartment.

In copending application Ser. No. 044,006, filed Apr. 29, 1987 by Kenneth P. Adasek et al, assigned to the assignee of this invention and hereby incorporated by reference, an air distributing system is disclosed in which both front and rear seated passengers have HVAC air selectively deliverable to their seats with the rear air flow selectively controlled by auxiliary fans within rearwardly-extending ducts having outlets in the rear passenger seating area in the occupant compartment.

In view of automotive space constraints and routing required for effective delivery by systems such as set forth in the above cited copending application, special duct work and specialized air boosters will be required. With this in mind, the present invention provides a new and improved air delivery system utilizing auxiliary duct work, preferably of rectilinear cross section, which forms a straight through air flow path that is directly routed from front distributing duct work to the rear seating area for selective and effective air delivery for all seating areas. Preferably, this duct work also serves as part of a structural component of the vehicle such as door mounted arm rest or a centralized console and pneumatically feed to a terminus having outlets adjacent to the rear seated passengers. In this invention, a booster fan is needed to control the flow level to a particular location independent of the flow level in the preceding air distribution system that in the preferred embodiment is formed by the front air distribution system. In this invention, a transverse fan having a straight through flow path from inlet to outlet when powered is employed since it can be made to fit any height-width ratio of the rectilinear cross section of the rearwardly directed duct work. In addition, the transverse fan is employed with a "pancake" motor with variable speed output that can be located outside of the duct work thereby avoiding any undesired blockage or restriction of the air flow path that would occur with axial flow fans.

In this invention, there is new and improved selective and control of air flow to the rear passenger compartment or seating area of an automotive vehicle. For example, when the variable speed main or primary fan is selected for low speed operation to suit front occupant comfort, the booster fan can be selectively driven at low intermediate or high speeds to provide increased flow to the rear passengers to suit their needs. Important advantage is, however, taken of the high turbining loss characteristic of the transverse type of fan to selectively provide a significant reduction in the air flow to the rear seating area for all primary fan speeds obtained. This is accomplished by eliminating boost simply by turning the transverse booster fan off to stop booster fan drive or by driving the booster fan at low speed when, for example, the primary fan is set for a high volume output. The same booster fan construction can be used for both left and right hand doors with the fan blades configured to pump air rearwardly.

It is an object of this invention to provide an air distribution system for the occupants compartment of a vehicle featuring a variable speed booster fan in supplemental ducting leading from a conventional multi-outlet frontal ducting for heating, ventilating and air conditioning so that a wide range of flow levels are available for delivery downstream of the frontal system.

Another object of this invention is to provide a new and improved air distribution system for vehicles with transverse booster fans within passages of interior vehicle components to control the flow level to air discharge openings in the rear seating area independent of the flow level in the preceding air distribution system for the front seating area.

Another object of this invention is to provide a new and improved air distribution system for the occupants compartment of a vehicle which features a wide range of output volumes of air personally selected by occupants in separate seating areas in the vehicle.

These and other features, advantages and objects of this invention will become more apparent from the following detailed description and drawing in which.

Figure 1:
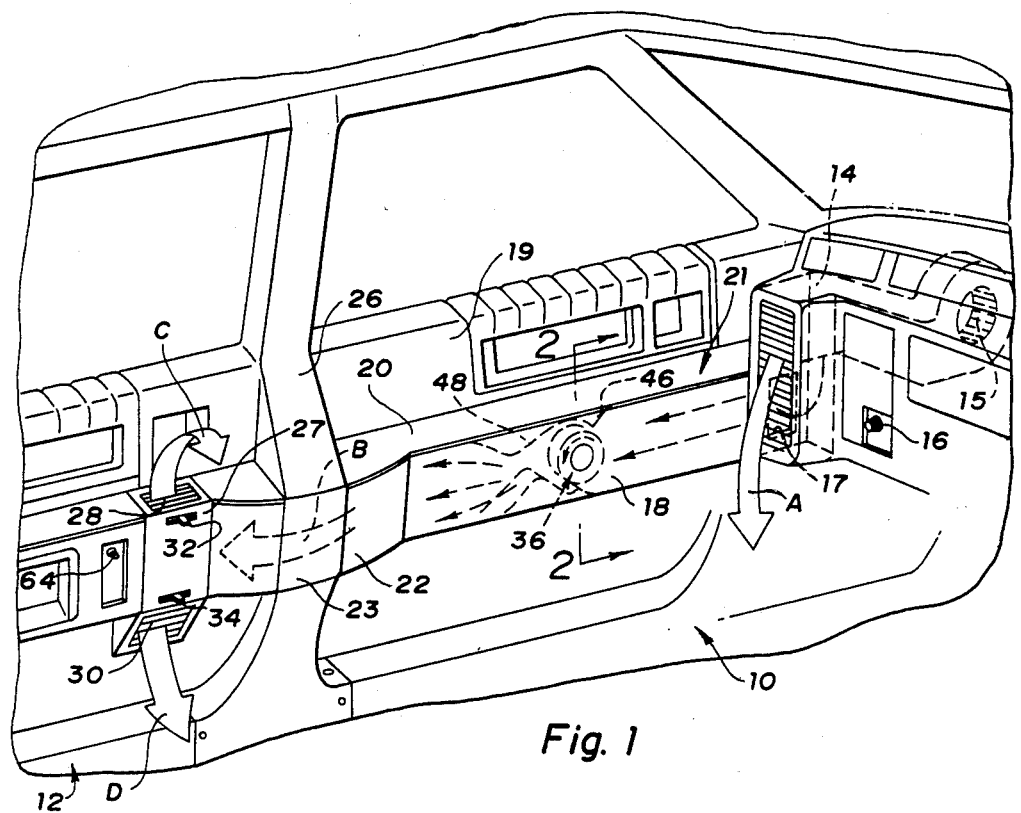
FIG. 1 is a pictorial drawing of a portion of the interior of a vehicle illustrating the air distribution system of this invention.

Turning now in greater detail to the drawing, there is shown in FIG. 1 the left side front and rear seating areas 10 and 12 of the occupant compartment of an automotive vehicle which are separate and discrete because of conventional seats for the driver and other occupants. The front seating area has, within the vehicle, a laterally extending and substantially modular duct work, the left hand side extension 14 being illustrated, to distribute HVAC air as shown by flow arrow A to the front seating area 10. A variable speed primary air blower 15 driven by an electric motor which may be like that disclosed in U.S. Pat. No. 3,263,739 to Gaskill et al, issued Aug. 21, 1966, assigned to the assignee of this invention and hereby incorporated by reference is employed to force HVAC air through this front duct work. The rotational speed and output of this blower is selected by the vehicle operator through a conventional rotary switch 16.

The extension 14 has a side opening 17 that is adapted to pneumatically communicate with a narrow longitudinally extending side duct 18, rectilinear in cross section secured to the side of the left front door 19. This may be molded from a suitable plastics material or fabricated from metal stock. The duct may also be formed as part of the door panel which is secured to the door structure. In any event, the duct 18 has a foam cover 20 or other padding to provide a comfortable arm rest 21 for the vehicle operator or the front passenger with a right side installation corresponding to that shown on the left side. The side duct 18 terminates at a discharge end 22. When the door 19 is closed, the discharge end 22 pneumatically communicates with a crossover passage 23 formed in the cover 26 for the door pillar. This crossover passage provides for routing of HVAC, arrow B, to distribution chamber 27 communicating with the crossover passage. Chamber 27 is attached to the rear door or side panel and is formed with top and bottom discharge ports 28 and 30 having conventional adjustable louvers moved between fully opened and closed positions by a conventional lever system through manual operation of upper and lower control levers 32 and 34 to adjust the direction and volume of air flow illustrated by flow arrows C and D.

Figure 2:
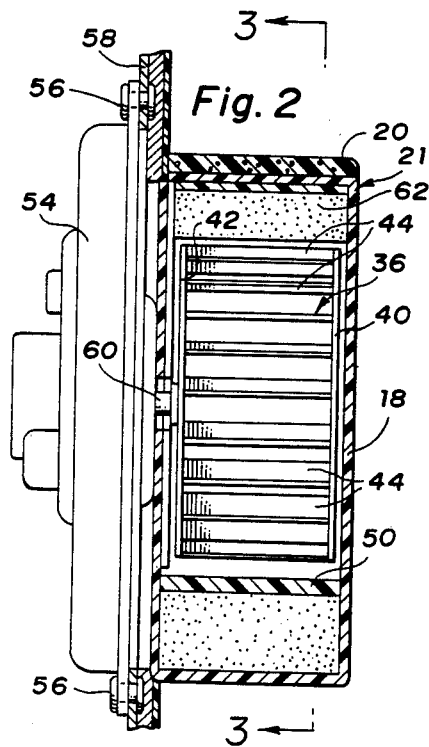
FIG. 2 is a cross-sectional view with parts in elevation taken generally along lines 2—2 of FIG. 1.
Figure 3:
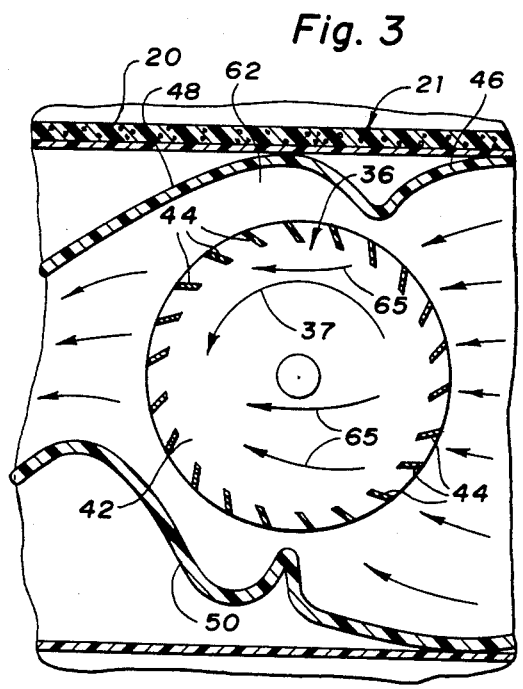
FIG. 3 is a cross-sectional view taken generally along lines 3—3 of FIG. 2.

Importantly, in this invention an air boost is provided within the duct and arm rest 21 for controlling the air flow through the rear openings 28 and 30 As illustrated in FIGS. 1-3, this invention incorporates a transverse fan assembly 36 with a bladed cage having laterally spaced and annular sides 40, 42 connected by an array of peripheral blades 44 for pumping air from an inlet 46 defined by upper and lower scrolls 48 and 50 which may be molded with duct 18.

The transverse fan 36 is rotatably driven at varying speeds (counterclockwise in viewing FIG. 3 as indicated by arrow 37) by an electrically energized pancake motor 54 whose housing is fixed by suitable fastening means 56 to the door panel 58. The pancake motor has a laterally extending output shaft 60 that is drivingly connected to the outer side of the transverse fan 36 which is mounted in a rotor space 62 defined by an off-on top and bottom scrolls 48 and 50. When energized by operation of the speed control switch 64, located adjacent to the rear seat, the rear passenger can select the speed and the volume of HVAC to rear seating areas. For example the booster speed and output can be selected for high, medium and low. The fan 36, especially when not powered by the motor has a high turbining loss characteristic to significantly reduce air flow to the rear discharge openings 28 and 30. This reduced flow of air can be further blocked or adjusted in flow levels by appropriate louver setting between fully closed and open positions. It will be appreciated that operating the booster fan at low speed while the primary blower is operating at a high speed, a reduction in flow to the rear seat areas occurs. This flow is, of course, greater than that of the turbining booster. In any event, by operating the transverse fan to the selected speed level, the pumped flow is straight through the fan as illustrated by arrows 65 to the rear passenger seating area and the flow level selected is substantially independent of the flow level in the front air distribution system in any particular mode of operation. If the front air is cooled and dehumidified by the air conditioner system and the primary blower is on low speed, the booster fan can be selectively operated at high speed by the rear seated passenger so that large quantities of cooled and dehumidified air can be supplied to the rear passengers where such is not desired by the driver.

This invention accordingly provides the vehicle occupants and particularly the rear seated occupants with an independent and wide selection of air flow control from minimum flow (booster fan off and turbining) to maximum flow (booster fan set for high speed and maximum output with optimized system efficiency by straight through booster pumping).

The above described preferred embodiment is illustrative of the invention which may be modified within the scope of the appended claims.

The embodiments of the invention in which an exclusive property or privilege is claimed are defined as follows:

1. In a vehicle, an air distributing system comprising forward duct work and a primary blower associated with said forward duct work for forcing air through said system, said system further comprising a secondary duct operatively connected to said forward duct work for the passage of air therethrough, said secondary duct having a generally rectilinear cross section and having an air inlet operatively connected to said forward duct work and an air outlet, said vehicle having discrete front and rear seating areas, said forward duct work having discharge openings for said front seating area, said secondary duct extending rearwardly from said front seating area to said rear seating area for distributing air thereto, variable output speed motor means mounted externally of said secondary duct, and transverse fan means operatively driven by said motor means and operatively mounted within said secondary duct for controlling the flow of air to said rear seating area when stationary and when rotatably driven at predetermined speeds, and means for controlling the output speed of said motor means and thereby the output speed of said transverse fan means to selectively reduce or increase flow to said rear seating area for all levels of flow in said forward duct work as generated by said primary blower.

2. In an air distributing system for the occupant compartment of a vehicle, said compartment having discrete front and rear seating areas, front duct work for said front seating area including primary blower means for forcing air through said front duct work, a rearwardly extending duct operatively connected to said front duct work for the passage of air from said front duct work to said rear seating area, said rearward extending duct having a generally rectilinear cross section and having an outlet in said rear seating area, variable output speed motor means mounted externally with respect to said rearwardly extending duct work, transverse fan means operatively mounted within said rearwardly extending duct and rotatably driven by said motor means to thereby control the quantity of air flowing to said rear compartment.

3. The air distribution system of claim 2 wherein the vehicle has side doors and said rearwardly extending duct is in at least one of said side doors to said vehicle and forms an arm rest for a vehicle occupant.

4. In a vehicle having a primary fan rotatably driven at varying speeds for forcing heating, ventilating and cooling air through primary duct means in a forward seating area in said vehicle, said vehicle having a rear seating area separate from said forward seating area, rearwardly extending narrow duct means operatively connecting said primary duct means to said rear seating area and transverse fan means operatively disposed in said narrow duct means and cooperating variable speed motor means supported externally of said narrow duct means for driving said fan means at variable speed, said transverse fan means being effective to substantially reduce the flow of air to said rear seating area by turbining when driven by said motor means at effective pumping speeds lower than the effective air pumping speed of the primary fan and to substantially increase the flow of air to said rear seating area by boosting the flow air when driven by said motor means at effective air pumping speeds sufficient to cause a pressure drop thereacross.

* * * * *